United States Patent [19]

Weihe, Jr.

[11] 4,158,263
[45] Jun. 19, 1979

[54] SAILING SIMULATOR

[76] Inventor: Clyde R. Weihe, Jr., 17 Lindbergh Ave., Needham, Mass. 02194

[21] Appl. No.: 836,371

[22] Filed: Sep. 26, 1977

[51] Int. Cl.² ............................................. G09B 9/06
[52] U.S. Cl. ...................................................... 35/11 A
[58] Field of Search ........................ 35/11 A; 114/39; 272/1 B, 17, 18, 32

[56] References Cited

U.S. PATENT DOCUMENTS

| 2,208,083 | 7/1940 | Rousseau | 35/11 A |
| 2,855,702 | 10/1958 | Taylor | 35/11 A |
| 3,238,911 | 3/1966 | Pazulski | 114/39 |
| 3,595,190 | 7/1971 | Lapworth | 114/39 |
| 3,597,856 | 8/1971 | Waddington et al. | 35/11 A |

*Primary Examiner*—William H. Grieb
*Attorney, Agent, or Firm*—Richard L. Stevens

[57] ABSTRACT

A sailing simulator wherein a sailboat is tethered to a circular guide rail, which guide rail is slidably secured to the walls of a reservoir. A propeller provides a motive force for the sailboat. Either natural or artificial wind is provided and within the limits of the reservoir all sailing maneuvers, except running with the wind, can be simulated.

2 Claims, 4 Drawing Figures

SAILING SIMULATOR

BACKGROUND AND BRIEF SUMMARY OF THE INVENTION

This invention relates to a training simulator for sailing.

Training devices have been employed in the past and typically are complex devices simulating the feel of a sailboat in response to wind and current changes. These devices may range from a fixed sailboat with winds generated by fans coming from various directions to a sailboat suspended on a movable platform in an attempt to duplicate the action of water. My present invention is a sailing simulator which comprises a reservoir, a non-linear guide rail secured to the walls of the reservoir, means to secure a sailboat fore and aft to the guide rail and means to propel the boat when the tiller is moved from center to either a port or starboard direction.

In the preferred embodiment of the invention, the guide rail is circular and the boat is tethered fore and aft to the guide rail.

DESCRIPTION OF THE PREFERRED EMBODIMENT

Figure 1:
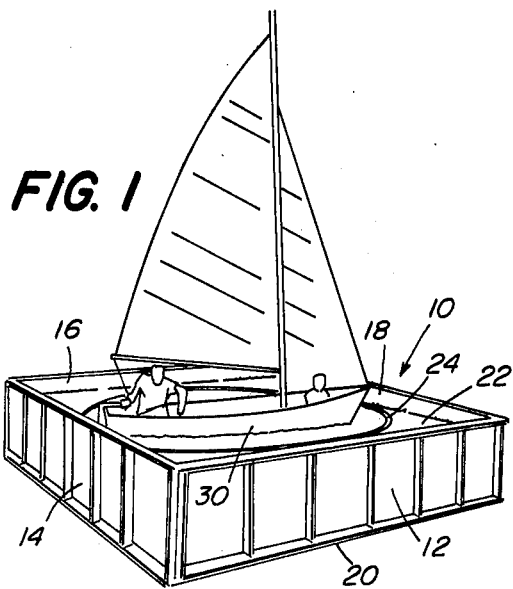
FIG. 1 is a perspective illustration of an embodiment of my invention.
Figure 2:
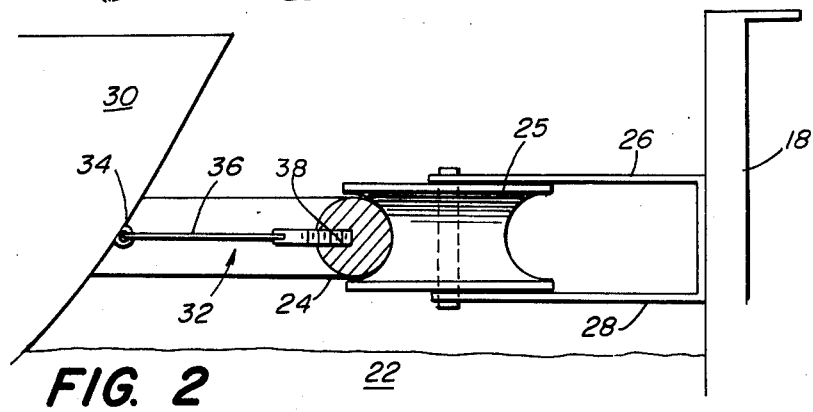
FIG. 2 is a front elevation of a clamp guide rail assembly.

Referring to FIG. 1 a perspective illustration of the preferred embodiment of my invention is shown and comprises a square reservoir 10 having four walls 12, 14, 16 and 18; and a floor 20, the reservoir filled with water 22. Slidably secured to the center of each of the walls 12–18 is a substantially rigid circular bouyant guide rail 24. As shown in FIG. 2 the guide rail 24 is received in the concave surface of a wheel 25. There are four wheels 25, one associated with each of the walls 12–16. Support arms 26 and 28 are welded to the walls 12–18 and extend over and under the wheel 25, and the wheel 25 is journalled to the arms 26 and 28.

A sailboat 30 is tethered fore and aft to the rail 24. Tethers 32 and 40 limit the forward and rearward movement of the boat 30 to prevent the boat from contacting the rail 24.

Figure 4:
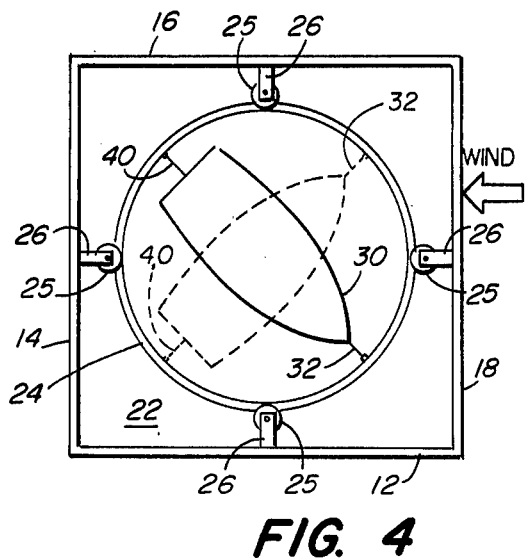

The tether 32 comprises a hook 34 to engage the boat, a line 36 and a threaded end 38 received in the rail 24. The tether 40, shown in dotted lines in FIG. 4, is similarly constructed and comprises a hook, a line, and a threaded end. The rail 24 is dimensioned in reference to the four wheels 25 to provide complete rotatable movement within the reservoir while insuring the rail 24 does not disengage from the wheels.

The boat 30 may be any commonly available sailboat such as an AMF Puffer sailboat and includes a tiller 50.

Figure 3:
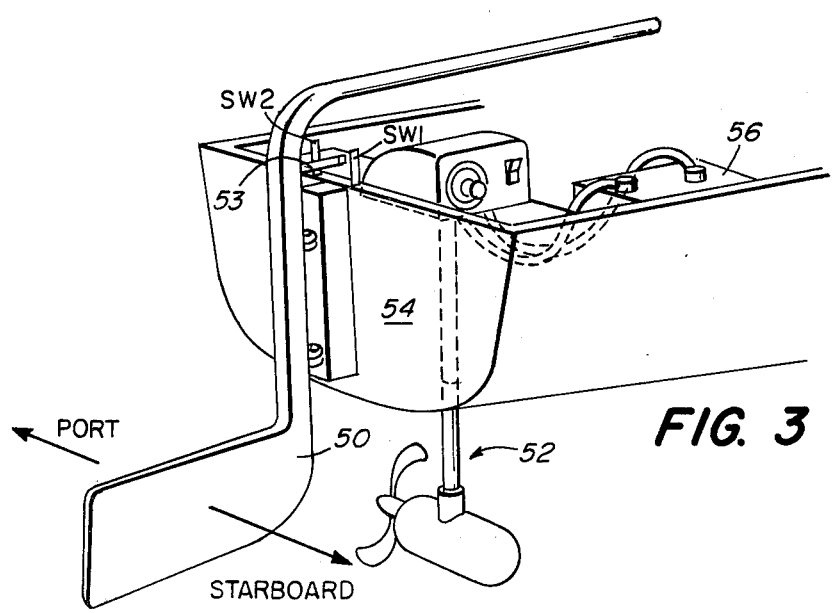
FIG. 3 is a schematic of the propeller assembly arrangement in the preferred embodiment; and, FIG. 4 is a plan view of one teaching movement.

In FIG. 3 the tiller 50 is shown in combination with a battery operated propeller assembly 52. The propeller is fixed to the stern in the position shown, that is lying in a plane which is perpendicular to the transom 54. This battery operated propeller assembly is standard and may include a Sears-Roebuck Electric Fishing Trolling Motor. Referring to FIG. 3, when the tiller is moved either to port or starboard, contact is made with switches SW-1 and SW-2 respectively by arm 53 and the propeller rotates either clockwise or counterclockwise tending to move the stern either port or starboard. The direction of movement created solely by the propeller 52 is substantially in the direction shown by the heavy arrows in FIG. 3. The switches SW-1 and SW-2, are simply OFF-ON single pole switches biased to an OFF position. Thus when the tiller 50 disengages either switch the propeller stops. When the tiller 50 is directly perpendicular to the transom 54 neither switch is engaged. The switches are fixedly secured on either side of the tiller, in any suitable manner and appropriately wired to the propeller assembly 52 such that when one of the switches is closed the circuit is closed actuating the propeller in the desired direction. The propeller assembly 52 is connected to a power source, such as a battery 56. The propeller assembly 52 is well known and need not be described in detail.

In the operation of the invention a wind is created by fan or natural wind is used. FIG. 4 illustrates a typical maneuver which can be achieved with my invention. With the wind coming from the direction marked by the heavy arrow, the movement of the tiller 50 to starboard will simulate a tacking maneuver and the boat 30 will move from the position shown in solid lines to the position shown in dotted lines. Preferably the water level is such that the rail 24 floats within the concave surface of the wheel 25.

Other sailing movements which may be simulated are jibing and reaching.

The actual feel of sailing is accomplished in shallow water within restricted limits. Other designs may include an eliptical guide rail with extended tethers. Additionally other clamping arrangements will be obvious to those skilled in the art.

Having described my invention, what I now claim is:

1. A sailing simulator comprises;
    (a) a reservoir;
    (b) a circular guide rail secured to the reservoir in a movable manner;
    (c) a sailboat having a transom and a tiller, the sailboat disposed in the reservoir;
    (d) means to propel the boat secured to the boat, said means independent of a movement of air, said means to propel including a propeller, the propeller fixed to the boat and lying in a plane perpendicular to the transom of the boat and means to rotate the propeller in one direction when the tiller is moved to starboard and means to rotate the propeller in a reverse direction when the tiller is moved to port; and
    (e) means to secure the boat fore and aft to the rail to allow non-linear movement of the boat within the reservoir and to prevent the boat from contacting the guide rail whereby sailing maneuvers may be simulated.

2. The simulator of claim 1, which includes;
a plurality of rollers secured to the walls of the reservoir, said rollers having concave surfaces and wherein the guide rail is received in the concave surfaces of the wheels.

* * * * *